(12) United States Patent
Shono

(10) Patent No.: US 6,337,955 B1
(45) Date of Patent: Jan. 8, 2002

(54) SLR CAMERA WHICH CAN SELECTIVELY UTILIZE LIGHT-SENSITIVE FILM OR AN IMAGE PICK-UP DEVICE

(75) Inventor: Tetsuji Shono, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,494

(22) Filed: May 18, 2000

(30) Foreign Application Priority Data

May 21, 1999 (JP) .......................................... 11-141199
Sep. 30, 1999 (JP) .......................................... 11-279892

(51) Int. Cl.$^7$ .............................................. G03B 17/02
(52) U.S. Cl. ....................... 396/429; 396/440; 396/452; 396/536; 396/541
(58) Field of Search ................................ 395/429, 440, 395/452, 536, 541; 348/64

(56) References Cited

U.S. PATENT DOCUMENTS

| | | | |
|---|---|---|---|
| 4,953,029 A | * | 8/1990 | Morimoto et al. ............ 348/64 |
| 5,179,478 A | | 1/1993 | Aoki ....................... 358/906 X |
| 5,870,638 A | | 2/1999 | Kurosawa ............... 396/429 X |
| 5,940,642 A | * | 8/1999 | Ishiguro ................. 396/429 X |
| 6,035,144 A | * | 3/2000 | Gfeller ................... 396/429 X |
| 6,035,147 A | | 3/2000 | Kurosawa ................... 396/429 |

* cited by examiner

Primary Examiner—W. B. Perkey
(74) Attorney, Agent, or Firm—Greenblum & Bernstein P.L.C.

(57) ABSTRACT

An SLR camera system includes a camera body, an interchangeable lens having a lens shutter, a film back and a digital back which are selectively attached to the camera body, a drive mechanism, provided in the digital back, which drives the image pick-up device in a direction of an optical axis of the interchangeable lens, and a controller. When digital back and the interchangeable lens are attached to the camera body, upon receiving a shutter release signal, the controller controls a focal plane shutter provided in the camera body to fully open and subsequently controls the drive mechanism to advance the image pick-up device to the focal plane before controlling the lens shutter to operate, controls the drive mechanism to retreat the image pick-up device, and subsequently controls the focal plane shutter to shut after controlling the lens shutter to operate.

12 Claims, 7 Drawing Sheets

SLR CAMERA WHICH CAN SELECTIVELY UTILIZE LIGHT-SENSITIVE FILM OR AN IMAGE PICK-UP DEVICE

BACKGROUND OF THE INVENTION

1. Field of the Invention

The present invention relates to an SLR camera using light-sensitive film or an electronic image pick-up device so that object images can be taken as latent images on the light-sensitive film or as digital images using the image pick-up device, which can be stored in a recording medium such as a floppy disk or a flash memory.

2. Description of the Related Art

Roll-film SLR cameras using an interchangeable film back which are designed so that different types of film (e.g., 70 mm wide film—either 120 or 220 roll-film, negative film or positive film) can be selectively used are known. In this type of camera, if the sensitive surface of an image pick-up device (e.g., a CCD image sensor) can be properly positioned in a focal plane in camera body, the camera can be used as digital camera. Accordingly, a digital back has been proposed in which an image pick-up device (e.g., a CCD image sensor) is provided, instead of a light-sensitive film, so that the camera can be used as a digital camera when the digital back is attached to the camera body.

The digital back must be provided in front of the image pick-up device thereof with a filter group which includes, e.g., a filter for filtering infrared rays, a low-pass filter, a protection glass for protecting the image pick-up device from dust and/or other filter or filters. On the other hand, it is necessary for an exposed front surface (light-sensitive surface) of a strip of film to be positioned in a focal plane formed through the photographic lens when the film back is attached to the camera body. Due to this conventional structure, if the digital back is attached to the camera body instead of the film back, it is difficult to arrange the sensitive surface of the image pick-up device to be positioned in the focal plane. This is because the sensitive surface of the image pick-up device needs to be positioned behind the focal plane by a distance corresponding to the total thickness of the aforementioned filter group positioned in front of the image pick-up device so as to prevent the filter group from interfering with the focal plane shutter provided in the camera body. If the sensitive surface of the image pick-up device is simply arranged to be positioned in the focal plane, the aforementioned filter group will definitely interfere with the focal plane shutter provided in the camera body. If the protection glass is formed so as to be extremely thin, while the other filter or filters of the filter group are positioned between the focal plane shutter and the photographic lens, such a problem is eliminated in theory. However, this is impractical.

The same problem occurs in not only roll-film SLR cameras using the interchangeable film back, but also in conventional SLR cameras having a focal plane shutter, in the case where an digital back cover (i.e., an openable back cover having an image pick-up device therein) instead of a film back cover is rotatably coupled to the back of the camera body via a hinge. Namely, the aforementioned filter group positioned in front of the image pick-up device of the digital back cover likewise interferes with the focal plane shutter of the camera body.

SUMMARY OF THE INVENTION

An object of the present invention is to provide an SLR camera which can be selectively used as a conventional SLR camera using light-sensitive film, or as a digital camera using an image pick-up device, wherein the aforementioned filter group, which is positioned in front of the image pick-up device provided in a digital back or digital back cover, does not interfere with the focal plane shutter when the camera is used as a digital camera.

The present invention has been made based on an idea of using an interchangeable lens provided therein with a lens shutter (a diaphragm shutter, bladed lens shutter) while prohibiting the focal plane shutter of the camera body from operating as a shutter when the SLR camera is used as a digital camera, and another idea of providing the SLR camera with a device for preventing the image pick-up device from interfering with the focal plane shutter of the camera body.

SLR cameras according to the present invention are generally classified into two types: a first type wherein either a film back or a digital back is selectively attached to the camera body, and a second type wherein a film back cover or a digital back cover is selectively rotatably coupled to the back of the camera body. These two types substantially have the common mechanical structure but are controlled in different manners.

In order to achieve the above mentioned object, an SLR camera system is provided, including a camera body having a focal plane shutter; an interchangeable lens detachably attached to the camera body, the interchangeable lens including a lens shutter; a film back and a digital back which are selectively attached to the camera body, the film back accommodating a light-sensitive film which is to be positioned, upon the attachment thereof to the camera body, at a focal plane located in the camera body, the digital back including an image pick-up device, and the image pickup device having a sensitive surface which is positioned at the focal plane upon the attachment of the digital back to the camera body; a drive mechanism, provided in the digital back, which drives the image pick-up device in a direction of an optical axis of the interchangeable lens; and a controller which controls the focal plane shutter, the lens shutter, and the drive mechanism when the digital back and the interchangeable lens are attached to the camera body. When the digital back and the interchangeable lens are attached to the camera body, upon receiving a shutter release signal, the controller controls the focal plane shutter to fully open and subsequently controls the drive mechanism to advance the image pick-up device so as to move the sensitive surface thereof to the focal plane before controlling the lens shutter to operate, and wherein the controller controls the drive mechanism to retreat the image pick-up device and subsequently controls the focal plane shutter to shut after controlling the lens shutter to operate.

The drive mechanism can include, for example, at least one feed screw for moving the image pick-up device in the direction of the optical axis, and a drive motor for rotating the at least one feed screw in forward and reverse directions.

Preferably, the drive mechanism includes a position detector for detecting the position of the image pick-up device, and at least one stopper which prevents the image pick-up device from advancing further when the sensitive surface has moved to the focal plane. The controller cuts off power supply to the drive motor before the sensitive surface reaches the focal plane in accordance with the detection of the position detector, when the image pick-up device is driven to advance by the drive mechanism.

According to another aspect of the present invention, a camera body is provided, including a focal plane shutter; an interchangeable lens detachably attached to the camera body, the interchangeable lens including a lens shutter; a film back and a digital back which are selectively attached to the camera body, the film back accommodating a light-sensitive film which is to be positioned, upon the attachment thereof to the camera body, at a focal plane located in said camera body, the digital back including an image pick-up device, and the image pick-up device having a sensitive surface which is positioned at the focal plane upon the attachment of the digital back to the camera body; a drive mechanism, provided in the digital back, which drives the image pick-up device in a direction of an optical axis of the interchangeable lens; and a controller which controls the focal plane shutter, the lens shutter, and the drive mechanism when the digital back and the interchangeable lens are attached to the camera body. The controller controls the focal plane shutter to fully open and subsequently controls the drive mechanism to advance the image pick-up device so as to move the sensitive surface thereof to the focal plane immediately after the interchangeable lens and the digital back are attached to the camera body. The controller controls the drive mechanism to retreat the image pick-up device and subsequently controls the focal plane shutter to shut when the digital back is detached from the camera body.

The drive mechanism can include, for example, at least one feed screw for moving the image pick-up device in the direction of the optical axis; and a drive motor for rotating the at least one feed screw in forward and reverse directions.

Preferably, the drive mechanism includes a position detector for detecting the position of the image pick-up device, and at least one stopper which prevents the image pick-up device from advancing further when the sensitive surface has moved to the focal plane. The controller cuts off power supply to the drive motor before the sensitive surface reaches the focal plane in accordance with the detection of the position detector, when the image pick-up device is driven to advance by the drive mechanism.

According to another aspect of the present invention, an SLR camera system is provided, including a camera body having a focal plane shutter; an interchangeable lens detachably attached to the camera body, the interchangeable lens including a lens shutter; a film back and a digital back which are selectively attached to the camera body, the film back accommodating a light-sensitive film which is to be positioned, upon the attachment thereof to said camera body, at a focal plane located in said camera body, the digital back including an image pick-up device, and the image pick-up device having a sensitive surface which is positioned at the focal plane upon the attachment of the digital back to the camera body; a drive mechanism, provided in the digital back, which drives the image pick-up device in a direction of an optical axis; and a controller which controls the focal plane shutter so as to fully open, and subsequently controls the drive mechanism to advance the image pick-up device so as to move the sensitive surface thereof to the focal plane immediately after the interchangeable lens and the digital back are attached to the camera body.

According to another aspect of the present invention, an SLR camera system is provided, including a camera body including a focal plane shutter, a hinge, a film back cover which can be coupled to the hinge so as to be openable about the hinge, and a pressure device for pressing against a light-sensitive film in the area of a film frame to keep the light-sensitive film flat thereat; a digital back cover which can be coupled to the hinge instead of the film back cover so as to be openable about the hinge, the digital back cover including an image pick-up device, wherein a sensitive surface of the image pick-up device is to be positioned at a focal plane located in the camera body; a back-cover detector, wherein in the case where the digital back cover is coupled to the hinge, when the digital back cover is rotated about the hinge from an open state to a closed state, the back-cover detector detects a position wherein the focal plane shutter needs to be opened in order to prevent the sensitive surface of the image pick-up device from interfering with the focal plane shutter; an interchangeable lens detachably attached to the camera body and including a lens shutter; and a controller which controls the focal plane shutter when the digital back cover and the interchangeable lens are attached to the camera body. In the case where the digital back cover is coupled to the hinge, when the digital back cover is rotated about the hinge from the open state to the closed state, the controller controls the focal plane shutter to fully open so as to allow the sensitive surface of the image pick-up device to move to the focal plane immediately after the back-cover detector detects the above-mentioned position, and when the digital back cover is rotated about the hinge from the closed state to the open state, the controller controls the focal plane shutter to shut immediately after the back-cover detector detects the above-mentioned position.

Preferably, the interchangeable lens further includes an iris diaphragm.

The image pick-up device can be, for example, a CCD image sensor.

In an embodiment, the digital back further includes a filter group fixedly positioned in front of the image pick-up device.

The back-cover detector can include, for example, a projection which is formed integral with the digital back cover, and a switch, provided in the camera body, which is turned ON and OFF when the projection of the digital back cover presses against and withdraws from the switch, respectively.

The present disclosure relates to subject matter contained in Japanese Patent Applications No.11-141199 (filed on May 21, 1999) and No.11-279892 (filed on Sep. 30, 1999) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
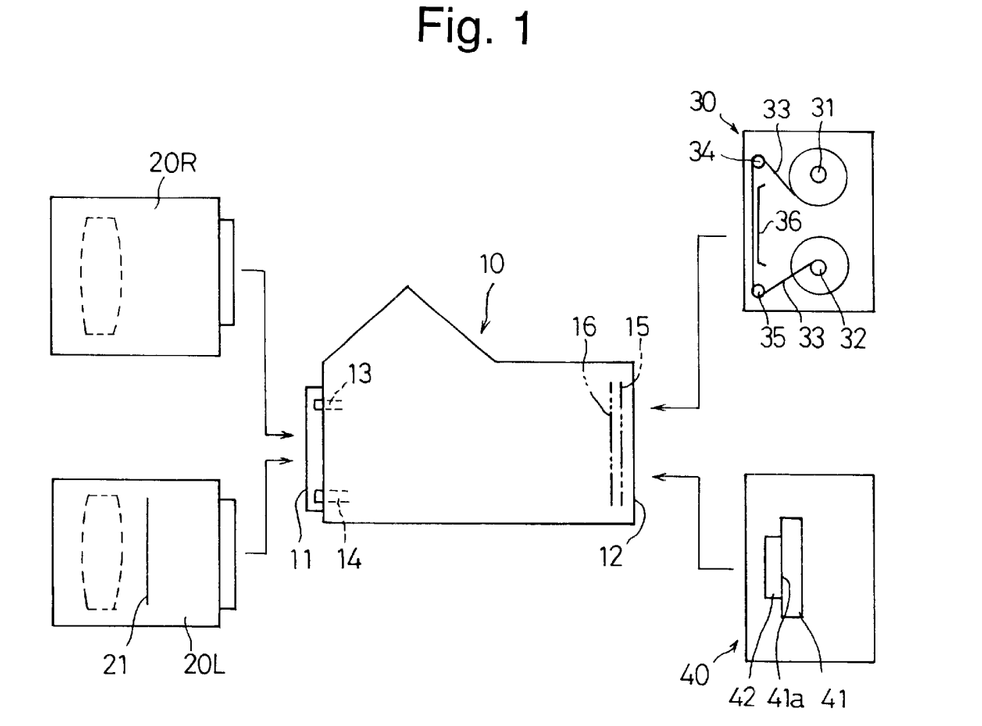
FIG. 1 is a schematic illustration of an SLR camera system according to the present invention whose camera body has a focal plane shutter, wherein a film back or a digital back is selectively attached to the camera body.

FIG. 1 is a schematic illustration of an SLR camera system according to the present invention. An SLR camera body 10 is provided at the front thereof with a body mount 11 to which a first interchangeable lens 20R or a second interchangeable lens 20L is detachably mounted. The SLR camera body 10 is provided at the rear thereof with a back mount 12 to which a film back 30 or a digital back 40 is detachably attached. The first interchangeable lens 20R is provided therein with an iris diaphragm (not shown) and is not provided with a lens shutter, whereas the second interchangeable lens 20L is provided therein with an iris diaphragm (not shown) and also a lens shutter 21. The mechanism of the lens shutter 21 is per se known and is, for example, identical to that of a conventional lens shutter which is incorporated in a typical lens-shutter type camera. The iris diaphragm, also per se known, is a diaphragm which can change the size of the opening in accordance with the brightness of the object.

Figure 2:
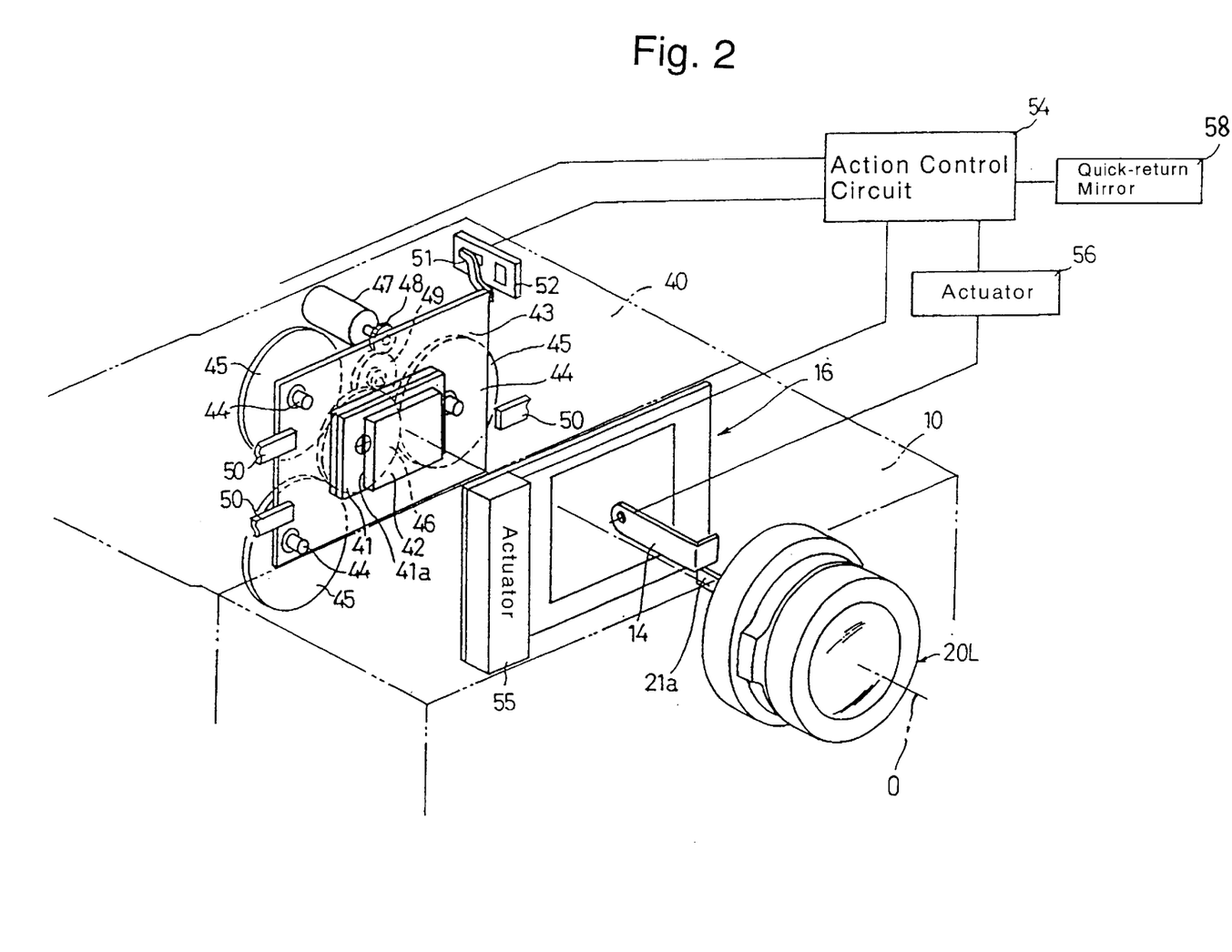
FIG. 2 is a perspective view of an example of fundamental elements of the digital back shown in FIG. 1.

The camera body 10 is provided with a diaphragm drive lever 13 for driving the iris diaphragm of the first or second interchangeable lens 20R or 20L, and a shutter drive lever 14 for driving the lens shutter 21 of the second interchangeable lens 20L. In FIG. 2 the diaphragm drive lever 13 is not illustrated. An interlocking mechanism for interlocking the iris diaphragm and the lens shutter in the interchangeable lens 20R or 20L with the camera body 10 can be any conventional interlocking mechanism. The camera body 10 is provided in front of a focal plane (image plane) 15 with a focal plane shutter 16. The camera body 10 is further provided in front of the focal plane 15 with a quick-return mirror. The quick-return mirror is shown as a block 58 in FIG. 2. This quick-return mirror 58 reflects object light upwardly to a finder optical system (not shown) when in an initial position, and allows the object light to proceed towards to the focal plane when in a raised or retreated position per se known.

Either the film back 30 or the digital back 40 can be selectively attached to the back mount 12 of the camera body 10. The film back 30 is provided therein with a roll-film feed spool 31 and a take-up spool 32. The roll-film 33 on the film feed spool 31 is wound on the take-up spool 32 via guide rollers 34 and 35. The film back 30 is provided, behind a plane in which the guide rollers 34 and 35 lie, with a pressure plate 36. When the film back 30 is attached to the back mount 12 of the camera body 10, part of the roll-film 33 which is positioned immediately in front of the pressure plate 36 lies in the focal plane 15 located in the camera body 10. The film back 30 is always used together with the first interchangeable lens 20R. Namely, when the first interchangeable lens 20R is attached to the lens mount 11, the film back 30 is attached to the back mount 12 to be used together with the first interchangeable lens 20R. In this state, by controlling the focal plane shutter 16 to operate, light of the object image that is passed through the first interchangeable lens 20R is exposed on the aforementioned part of the roll-film 33 which is positioned immediately in front of the pressure plate 36.

The digital back 40 is provided therein with an image pick-up device (e.g., a CCD image sensor) 41. The digital back 40 is always used together with the second interchangeable lens 20L. The digital back 40 is provided immediately in front of a sensitive surface 41a of the image pick-up device 41 with a filter group 42 which is composed of, e.g., a filter for filtering infrared rays, a low-pass filter, a protection glass for protecting the image pick-up device from dust and/or the like). If the thickness of the filter group 42 is extremely small, the sensitive surface 41a can be precisely positioned to coincide with the focal plane 15. However, in practice, the thickness of the filter group 42 cannot be made so small. The filter group 42 is so thick that it interferes with the focal plane shutter 16 when the digital back 40 is attached to the back mount 12, causing the sensitive surface 41a coincide with the focal plane 15 if the image pick-up device 41 is fixedly disposed in the digital back 40.

To this end, the digital back 40 is provided with a drive mechanism for driving the image pick-up device 41 in a manner such that the filter group 42 does not interfere with the focal plane shutter 16. The image pick-up device 41 is secured to a flat movable substrate 43 (see FIG. 2). This movable substrate 43 extends perpendicular to an optical axis O of the second interchangeable lens 20L in a state where the digital back 40 is attached to the camera body 10. Three parallel feed screws 44 are respectively screw-engaged with three female-threaded holes formed on the movable substrate 43. A gear 45 is coaxially formed integral with each feed screw 44. These three gears 45 have the same shape and size and stay engaged with a common central gear 46. The central gear 46 is driven forwardly and reversely by a reversible drive motor 47 via a pinion 48 and a relay gear 49. The pinion 48 is fixedly fitted on a rotary shaft of the reversible drive motor 47. The feed screws 44, the gears 45, the central gear 46, the reversible drive motor 47, the pinion 48 and the gear 49 constitute the drive mechanism. Driving the center gear 46 forwardly and reversely by the reversible drive motor 47 causes each feed screw 44 to rotate in the same rotational direction at the same rotational speed, which causes the movable substrate 43, which carries the image pick-up device 41 and the filter group 42, to move forwardly and rearwardly in the direction of the optical axis O. During this movement, the image pick-up device 41 does not tilt relative to the optical axis O, i.e., the sensitive surface 41a of the image pick-up device 41 extends perpendicular to the optical axis O at all times. When the movable substrate 43 moves to the forward movable limit thereof in the direction of the optical axis O, the movable substrate 43 bumps against three stoppers 50 fixedly provided in the digital back 40. Accordingly, the stoppers 50 defines the forward movable limit of the movable substrate 43 in the direction of the optical axis O. When the movable substrate 43 comes into contact with the stoppers 50 with the digital back 40 being properly attached to the back mount 12, the sensitive surface 41a of the image pick-up device 41 properly coincides with the focal plane 15 located in the camera body 10.

A brush 51 adapted for detecting the axial position of the movable substrate 43 is fixed to the movable substrate 43. The brush 51 comes into sliding contact with a position sensor plate (position detector) 52. The position sensor plate 52 gives positional data of the movable substrate 43 to an action control circuit (controller) 54 in accordance with the detected position of the brush 51 on the position sensor plate 52. The action control circuit 54 controls the reversible drive motor 47, an actuator 55 for the focal plane shutter 16, and an actuator 56 for the diaphragm drive lever 13 and the shutter drive lever 14. The action control circuit 54, the actuator 55 and the actuator 56 are all provided in the camera body 10.

Figure 3:
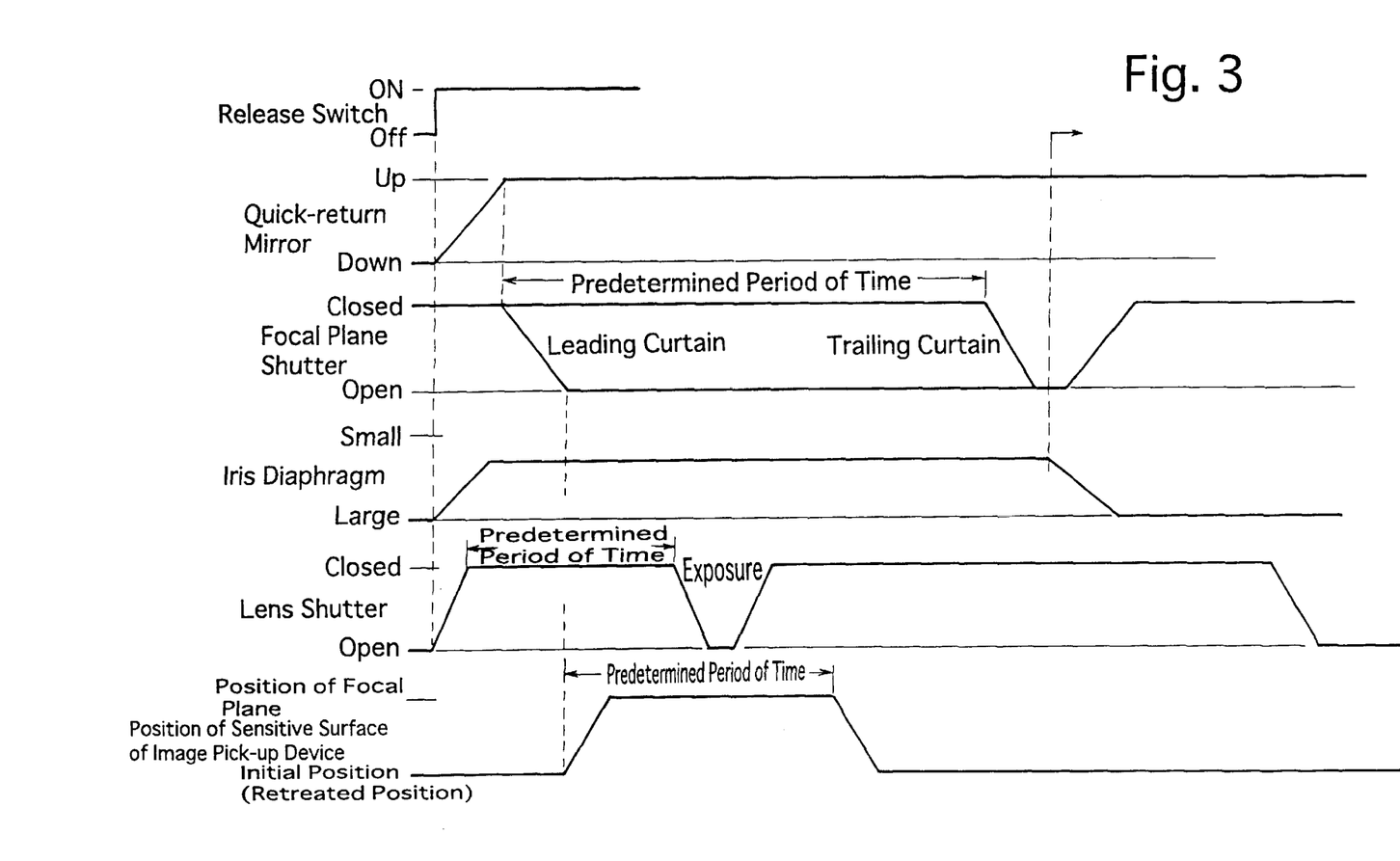
FIG. 3 is a time chart showing an example of a sequence of fundamental operations in the first embodiment of the SLR camera system according to the present invention.

FIG. 3 shows a time chart showing a sequence of fundamental operations in the first embodiment of the SLR camera system according to the present invention, wherein the second interchangeable lens 20L and the digital back 40 are attached to the body mount 11 and the back mount 12, respectively. A sequence of fundamental operations of the SLR camera system in the case where the first interchangeable lens 20R and the film back 30 are attached to the body mount 11 and the back mount 12, respectively, is not herein discussed because such a sequence is the same as that of a conventional typical SLR camera system using light-sensitive film.

Referring to FIG. 3, upon the release switch of the camera body 10 being turned ON (i.e., upon a shutter release signal being generated), the quick-return mirror 58 in the camera body 10 is driven to rise so as to retreat from an photographic optical path. At the same time, the action control circuit 54 controls the actuator 56 to actuate the diaphragm drive lever 13 and the shutter drive lever 14 so that the iris diaphragm of the second interchangeable lens 20L stops down to a predetermined diameter while temporarily closing the lens shutter 21. Upon the quick-return mirror 58 having completely risen, the action control circuit 54 receives a mirror-rise-completion signal. Upon receiving this signal, the action control circuit 54 controls the actuator 55 to actuate the focal plane shutter 16 to open the same, namely, to move the leading curtain (leading blind) thereof away from the photographic optical path. Upon the focal plane shutter 16 having completely opened, the action control circuit 54 controls the reversible drive motor 47 to operate in forward direction to advance the movable substrate 43 to thereby advance the image pick-up device 41 together with the filter group 42. At this time, since the focal plane shutter 16 has completely opened, the filter group 42 does not interfere with the focal plane shutter 16.

The action control circuit 54 cuts off the power supply to the reversible drive motor 47 immediately before the movable substrate 43 bumps against the stoppers 50 in accordance with the detection of the position sensor plate 52, which detects the axial position of the movable substrate 43. Although the power supply to the reversible drive motor 47 is cut off immediately before the movable substrate 43 bumps against the stoppers 50, the rotary shaft of the reversible drive motor 47 rotates on due to the force of inertia, so that the movable substrate 43 bumps against the stoppers 50 and finally stops. At this moment, the sensitive surface 41a of the image pick-up device 41 is properly positioned to coincide with the focal plane 15 located in the camera body 10.

Thereafter, the action control circuit 54 controls the actuator 56 to actuate the lens shutter 21 so that it remains open for a period of time corresponding to the detected brightness of the object so as to expose the sensitive surface 41a of the image pick-up device. At the time a predetermined period of time elapses after the exposure operation is completed, i.e., after the lens shutter 21 is closed, the action control circuit 54 controls the reversible drive motor 47 to operate in reverse direction so as to retreat the image pick-up device 41. In this operation of retreating the image pick-up device 41, the retreated position of the image pick-up device 41 does not have to be precise. Hence, in order to retreat the image pick-up device 41 back to the digital imaging device 40, the power supply to the reversible drive motor 47 only needs to be cut off when the action control circuit 54 detects, using the position sensor plate 52, that the image pick-up device 41 has retreated. At the time a predetermined period of time elapses after the reversible drive motor 47 starts to operate in reverse direction, the action control circuit 54 controls the actuator 55 to actuate the focal plane shutter 16 to drive the trailing curtain (trailing blind) thereof so as to close the focal plane shutter 16. Immediately after the focal plane shutter 16 is closed, the focal plane shutter 16 is charged for the subsequent picture-taking, and the iris diaphragm of the second interchangeable lens 20L is returned to a fully-opened state. Thereafter, the lens shutter 21 is charged, and finally the quick-return mirror 58 is driven back to the initial position thereof. This completes one sequence of fundamental operations in the first embodiment of the SLR camera system for taking a picture.

The present embodiment of the SLR camera system in the case where the second interchangeable lens 20L and the digital back 40 are attached to the body mount 11 and the back mount 12, respectively, is not limited solely to the particular sequence of operations shown in FIG. 3. For instance, such a sequence of operations can be modified as follows:

1. The exposure operation by the lens shutter 21 starts in response to a signal generated at the moment the movable substrate 43 bumps against the stoppers 50;

2. The operation of retreating the image pick-up device 41 starts in response to a signal generated at the moment the exposure operation by the lens shutter 21 is completed; and 3. The operation of driving the trailing curtain of the focal plane shutter 16 starts in response to a signal generated at the moment the movable substrate 43 disengages from the stoppers 50 or at the moment the movable substrate 43 fully retreats.

Figure 4:
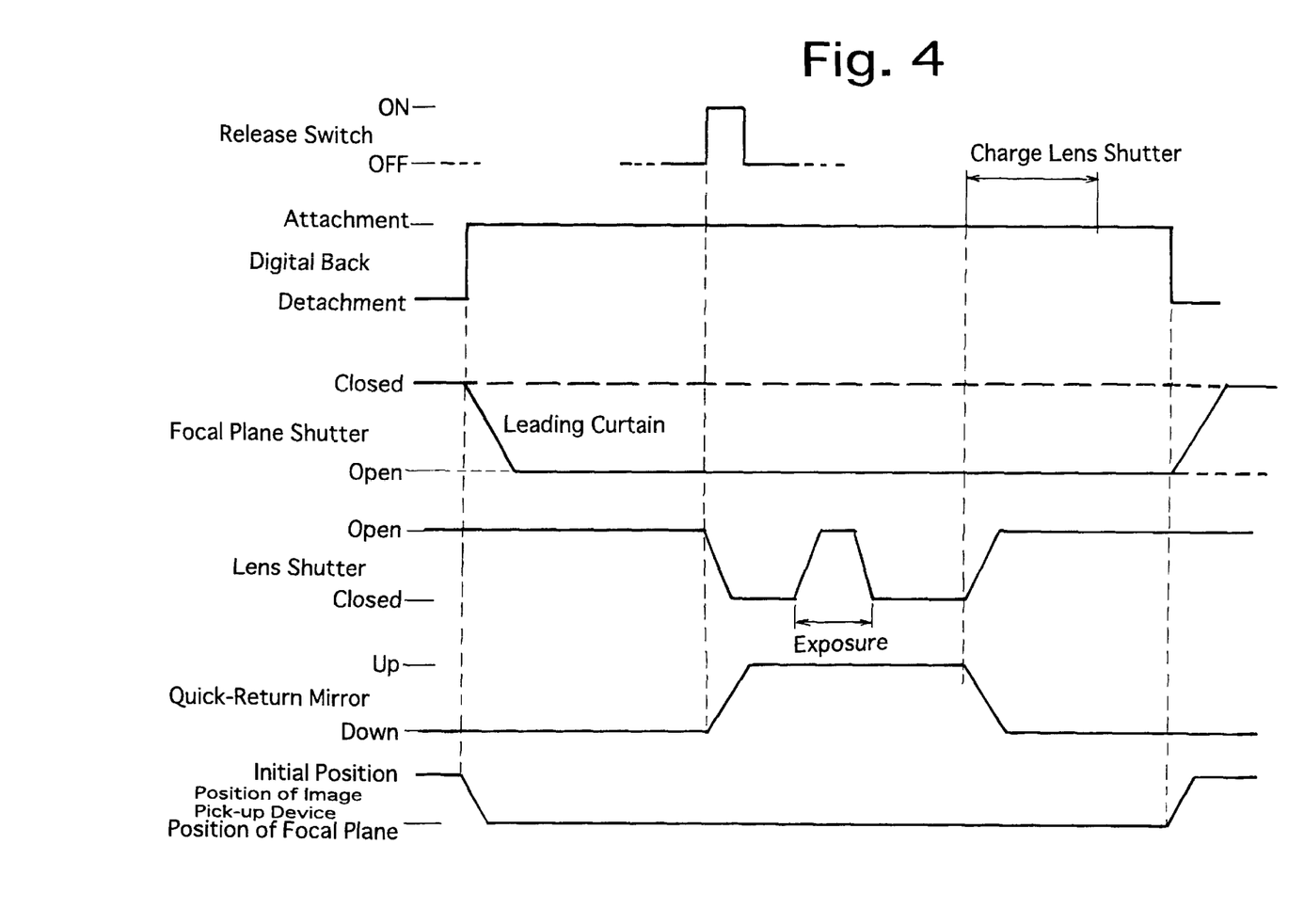
FIG. 4 is a time chart showing an example of a sequence of fundamental operations in the second embodiment of the SLR camera system according to the present invention.

FIG. 4 shows a time chart showing a sequence of fundamental operations in the second embodiment of the SLR camera system according to the present invention. In the first embodiment of the SLR camera system, the image pick-up device 41 is driven forwardly and rearwardly in the direction of the optical axis O each time a picture is taken, controlled according to the sequence of operations shown in FIG. 3, whereas in the second embodiment, the image pick-up device 41 is held in the advanced positioned thereof during the time the second interchangeable lens 20L and the digital back 40 are attached to the body mount 11 and the back mount 12, respectively.

Immediately after the second interchangeable lens 20L and the digital back 40 are attached to the body mount 11 and the back mount 12, respectively, the action control circuit 54 controls the actuator 55 to actuate the focal plane shutter 16 to open the focal plane shutter 16, namely, to move the leading curtain (leading blind) thereof away from the photographic optical path. At the same time, or at a short time later, the action control circuit 54 controls the reversible drive motor 47 to operate in forward direction to advance the movable substrate 43 to thereby advance the image pick-up device 41 together with the filter group 42 so that the sensitive surface 41a of the image pick-up device 41 coincides with the focal plane 15 located in the camera body 10. This control of the reversible drive motor 47 can be the same as that in the previous embodiment shown in FIG. 3.

In this state where the sensitive surface 41a of the image pick-up device 41 coincides with the focal plane 15 located in the camera body 10, if the release switch of the camera body 10 is turned ON, the action control circuit 54 controls the actuator 56 to actuate the shutter drive lever 14 to temporarily close the lens shutter 21. At the same time, the quick-return mirror 58 in the camera body 10 is driven to rise so as to retreat from an photographic optical path. Upon the quick-return mirror 58 having completely risen, the action control circuit 54 controls the actuator 56 to actuate the lens shutter 21 so that the lens shutter 21 remains open for a period of time corresponding to the detected brightness of the object so as to expose the sensitive surface 41a of the image pick-up device 41. At the time a predetermined period of time elapses after the exposure operation is completed, i.e., a predetermined time after the lens shutter 21 is closed, the quick-return mirror 58 is driven back to the initial position thereof, and the lens shutter 21 is charged. The sequence of these fundamental operations is performed each time a picture is taken.

When the digital back 40 is detached from the camera body 10, before the digital back 40 is removed from the camera body 10, the reversible drive motor 47 is controlled to operate in the reverse direction to retreat the image pick-up device 41, and subsequently the trailing curtain (trailing blind) of the focal plane shutter 16 is driven to close the focal plane shutter 16.

According to the second embodiment of the SLR camera system controlled according to the sequence of fundamental operations shown in FIG. 4, it is not necessary to move the image pick-up device 41 forwardly and rearwardly each time a picture is taken, so that the sequence of fundamental operations is simpler than that shown in FIG. 3.

Figure 5:
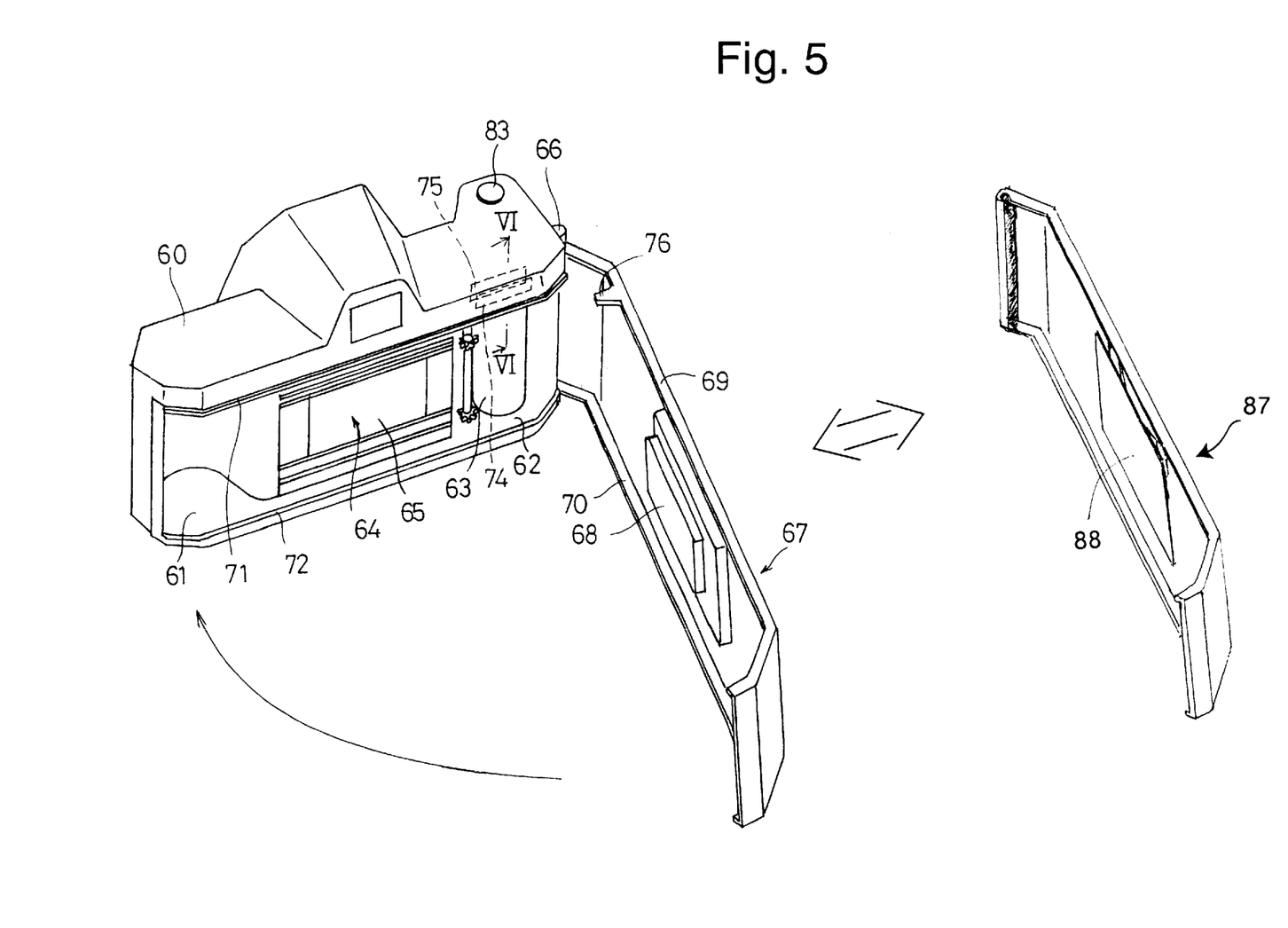
FIG. 5 is a perspective view of the third embodiment of the SLR camera system according to the present invention, showing a state thereof where the back cover is widely open.

FIG. 5 is a perspective view of the third embodiment of the SLR camera system according to the present invention in a state where the back cover is widely open. The SLR camera system includes a camera body 60 which is provided at an approximate center thereof with a rectangular photographic aperture (i.e., a picture format) 64 which forms the limits of each frame exposed. The camera body 60 is provided on left and right sides of the photographic aperture 64 with a cartridge chamber 61 in which a film cartridge is positioned and a spool chamber 62 in which a take-up spool 63 is positioned. The camera body 60 is provided on an upper face thereof with a release button 83 for releasing the shutter. The camera body 60 is provided on the front face thereof with a body mount (not shown) to which an interchangeable lens (omitted from FIG. 5) 20R or 20L is detachably attached. The camera body 60 is further provided at the back thereof with a digital back cover (digital back) 67 provided with an image sensor block 68. The digital back cover 67 is rotatably and detachably coupled to the camera body 60 via a hinge 66 which is fixed to the right end of the camera body 60. The digital back cover 67 is interchangeable. The digital back cover 67 can be interchanged with a film back cover 87 having a pressure plate (pressure device) 88 which presses against the film in the area of a film frame to keep the film flat thereat. The digital back cover 67 or the film back cover 87 is selectively coupled to the camera body 60 when the camera is used as digital camera or as a normal camera using film. Each of the digital back cover 67 and the film back cover 87 can be coupled to the camera body 60 via the hinge 66. Each back cover can be opened or closed with the back cover being coupled to the camera body 60 via the hinge 66.

As shown in FIG. 5, the digital back cover 67 is provided at an approximate center of the inner face thereof with the aforementioned image sensor block 68. The image sensor block 68 is composed of an image pick-up device and a filter group fixedly positioned immediately in front of the image pick-up device. The image pick-up device and the filter group are similar to the image pick-up device 41 and the filter group 42 shown in FIG. 1, respectively. The film back cover 87 which is to be used together with light-sensitive film is of a known type and therefore is not herein discussed.

The digital back cover 67, which is used when taking digital images, is provided at the upper and lower ends thereof with an upper flange 69 and a lower flange 70, respectively, each of which projects towards the camera body 60. The camera body 60 is provided on the back surface thereof with an upper groove 71 and a lower groove 72 in which the upper flange 69 and the lower flange 70 are fitted in, respectively, when the digital back cover 67 is closed.

Figure 6:
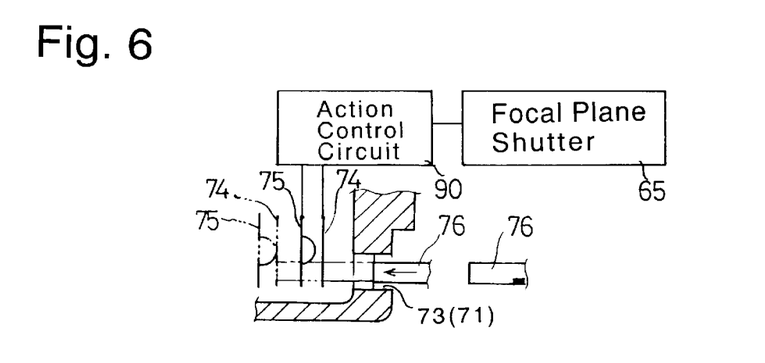
FIG. 6 is a cross sectional view of fundamental portion of the SLR camera system shown in FIG. 5, taken along line VI—VI shown in FIG. 5, looking in the direction of the appended arrows.

The camera body 60 is provided, in the upper groove 71 in the vicinity of the right end thereof as viewed in FIG. 6, with a through hole 73. The camera body 60 is provided therein behind the through hole 73 when viewed from the rear of the camera body 60, with a pair of conductive spring contacts 74 and 75 which are separate from each other as shown by solid lines in FIG. 6 when in a free state. The pair of spring contacts 74 and 75 constitute a switch. The pair of spring contacts 74 and 75 can bend forwardly and rearwardly (left and right as viewed in FIG. 6). When the pair of spring contacts 74 and 75 are in a free state, they are stationary at respective positions shown by solid lines in FIG. 6. Each of the spring contacts 74 and 75 is electrically connected to an action control circuit (controller) 90 provided in the camera body 60 (see FIG. 6). When the pair of spring contacts 74 and 75 come into contact with each other, they are electrically connected to each other (i.e., a back-cover detector is turned ON (see FIG. 8)).

The digital back cover 67 is provided, on the upper flange 69 at a position facing the through hole 73, with a projection 76. In the transition of the digital back cover 67 from an open state to a closed state (specifically, shortly before the digital back cover 67 is closed), the projection 76 penetrates the camera body 60 through the through hole 73 in the upper groove 71 to press the rear spring contact 74 against the front spring contact 75, which electrically connects the spring contacts 74 and 75. The pair of spring contacts 74 and 75 and the projection 76 together constitute a back-cover detector adapted to detect a position (non-interference position) wherein it is necessary for the focal plane shutter 65, provided in the camera body 60, to be opened in order to prevent the image sensor block 68, provided on the digital back cover 67, from interfering with the focal plane shutter 65 upon further closure of the digital back cover 67. The action control circuit 90 controls the focal plane shutter 65 in accordance with the signal generated by the back-cover detector.

Figure 7:
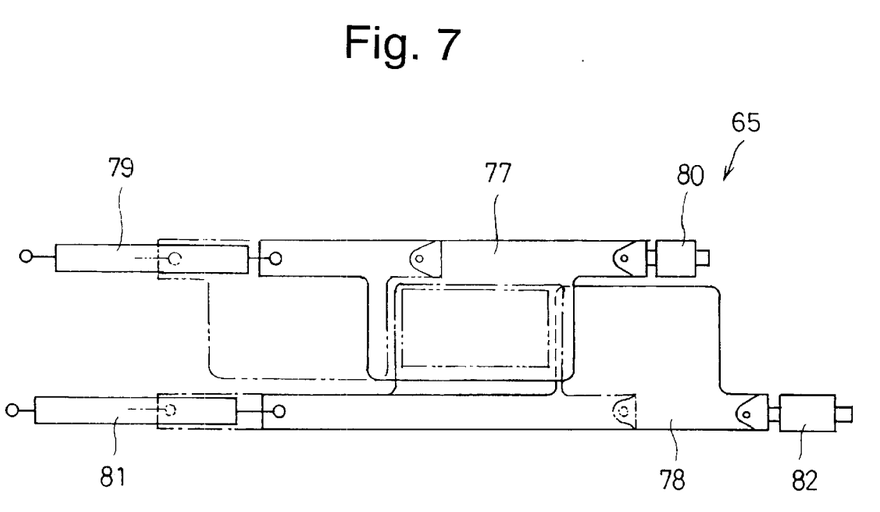
FIG. 7 is a front elevational view of a focal plane shutter provided in the SLR camera system shown in FIG. 5.

As shown in FIG. 7, the focal plane shutter 65 is provided with a leading curtain (leading blind) 77 and a trailing curtain (trailing blind) 78. The left end of the leading curtain 77 is engaged with the right end of a tension spring 79 whose left end is fixed to the camera body 60 so that the leading curtain 77 is continuously biased to the left by the spring force of the tension spring 79 as viewed in FIG. 7. The right end of the leading curtain 77 is engaged with a combination magnet 80 in which a composite magnetic force of a permanent magnetic force and an electromagnetic force is offset when power is supplied to the combination magnet 80. When no power is supplied to the combination magnet 80, the combination magnet 80 holds the right end of the leading curtain 77 by the magnetic force of the permanent magnet of the combination magnet 80 so that the leading curtain 77 stays at a position shown by solid line in FIG. 7. Once the power is supplied to the combination magnet 80 to offset the composite magnetic force, the leading curtain 77 is pulled to move by the tension spring 79 to a position shown by two-dot chain line shown in FIG. 7.

On the other hand, similar to the leading curtain 77, the left end of the trailing curtain 78 is engaged with the right end of a tension spring 81 whose left end is fixed to the camera body 60 so that the trailing curtain 78 is continuously biased to the left by the spring force of the tension spring 81 as viewed in FIG. 7. The right end of the trailing curtain 78 is engaged with a combination magnet 82 which is similar to the combination magnet 80. When no power is supplied to the combination magnet 82, the combination magnet 82 holds the right end of the trailing curtain 78 by the magnetic force of the permanent magnet of the combination magnet 82 so that the trailing curtain 78 stays at a position shown by solid line in FIG. 7. Once the power is supplied to the combination magnet 82 to offset the composite magnetic force, the trailing curtain 78 is pulled by the tension spring 81 to a position shown by the single-dot chain line shown in FIG. 7.

If the digital back cover 67 is closed completely in a state where the focal plane shutter 65 is closed, the image sensor block 68 enters into the photographic aperture 64, so that the filter group fixed in front of the image pick-up device interferes with the focal plane shutter 65. In order to prevent this problem from occurring, in the third embodiment of the SLR camera system, during the transition of the digital back cover 67 from an open state to a closed state, the projection 76 presses the rear spring contact 74 against the front spring contact 75 via the through hole 73 to thereby electrically connect the spring contacts 74 and 75 (i.e., the back-cover detector is turned ON), so that the action control circuit 90 controls the focal plane shutter 65 to open. This allows the image sensor block 68 to enter the photographic aperture 64 without interfering with the focal plane shutter 65. In this state, when the digital back cover 67 is completely closed, the sensitive surface of the image pick-up device provided in the image sensor block 68 coincides with the focal plane positioned in the camera body 60.

When the state of the digital back cover 67 changes from a closed state to an open state, the aforementioned operation when the state of the digital back cover 67 changes from an open state to a closed state is reversely performed. Namely, during the transition of the digital back cover 67 from a closed state to an open state, the projection 76 withdraws from the rear spring contact 74 to thereby disconnect the rear spring contact 74 from the front spring contact 75. Consequently, the spring contacts 74 and 75 are still at respective positions shown by solid lines in FIG. 6. Immediately after the rear spring contact 74 is disconnected from the front spring contact 75, the action control circuit 90 controls the focal plane shutter 65 so that the combination magnet 80 for the leading curtain 77 is charged to move the leading curtain 77 back to the initial position shown by solid line in FIG. 7. At the same time, the action control circuit 90 controls the focal plane shutter 65 so that the combination magnet 82 for the trailing curtain 78 is charged to move the trailing curtain 78 back to the initial position shown by solid line in FIG. 7. Consequently, the focal plane shutter 65 is closed.

Figure 8:
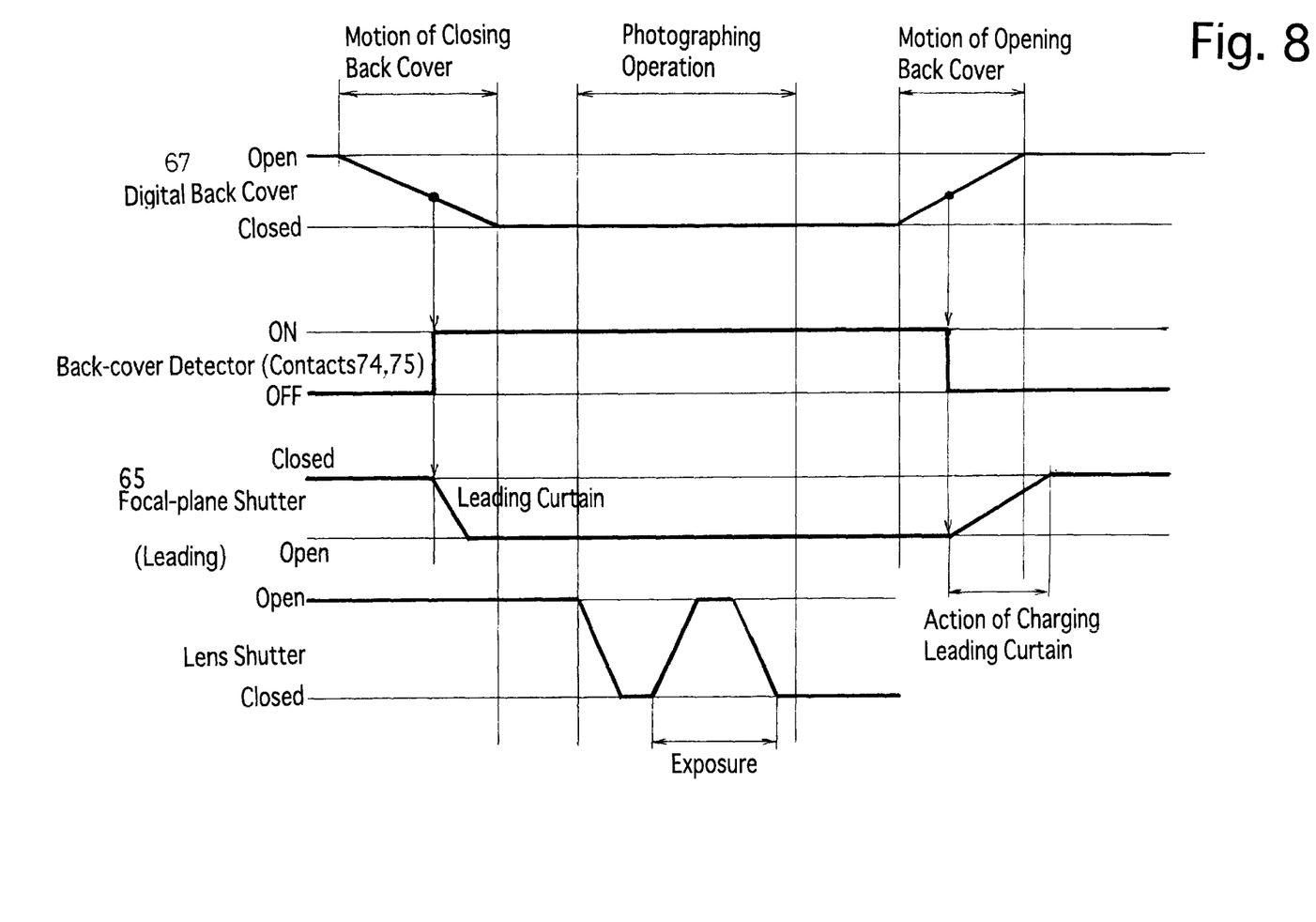
FIG. 8 is a time chart showing a sequence of fundamental operations in the third embodiment of the SLR camera system according to the present invention.

FIG. 8 shows a time chart showing a sequence of fundamental operations in the third embodiment of the SLR camera system shown in FIG. 5 according to the present invention, wherein the digital back cover 67, which is used to take digital images, is coupled to the camera body 60 via the hinge 66. A sequence of fundamental operations in the third embodiment of the SLR camera system for the interchangeable lens which is similar to the first interchangeable lens 20R, the film back cover 87 having a pressure plate 88 attached thereto, coupled to the body mount (not shown) of the camera body 60, and the hinge 66, is not herein discussed because such a sequence is the same as that of a conventional typical SLR camera system using light-sensitive film.

As shown in FIG. 8, during the transition of the digital back cover 67 from an open state to a closed state, immediately after the back-cover detector is turned ON (i.e., the rear spring contact 74 contacts with the front spring contact 75), the action control circuit 90 controls the focal plane shutter 65 to open by charging the leading curtain 77. Therefore, when the digital back cover 67 is completely closed, the filter group fixed in front of the image sensor block 68 can enter into the photographic aperture 64 without interfering with the focal plane shutter 65.

Although not illustrated in FIG. 8, immediately after the release button 83 is turned ON (i.e., immediately after a shutter release signal is generated), the conventional quick-return mirror (not shown) provided in the camera body 60 is driven to rise so as to retreat from an photographic optical path. At the same time, similar to the first or second embodiment, the action control circuit 90 controls the iris diaphragm provided in the interchangeable lens to stop down to a predetermined diameter while temporarily closing the lens shutter 21 provided in the interchangeable lens. Thereafter, the action control circuit 90 controls the lens shutter 21 in the interchangeable lens to remain open for a period of time corresponding to the detected brightness of the object so as to expose the sensitive surface of the image pick-up device provided in the image sensor block 68. After the exposure operation is completed, the lens shutter 21 remains closed. The closed lens shutter 21 fully opens again by a manual charging operation.

When the user desires to use the SLR camera as a normal SLR camera using light-sensitive film after they used the SLR camera as digital SLR camera, firstly the user opens the digital back cover 67. This makes the rear spring contact 74 disengage from the spring contact 75 to thereby turn the back-cover detector OFF, so that the action control circuit 90 controls the focal plane shutter 65 so that the combination magnet 80 for the leading curtain 77 is charged to close the focal plane shutter 65. In this state, the user only needs to exchange the digital back cover 67 with the film back cover 87 and at the same time exchange the interchangeable lens 20L having the lens shutter 21 with the interchangeable lens 20R having no lens shutter.

As can be understood from the foregoing, according to an SLR camera according to the present invention using light-sensitive film or an image pick-up device for taking pictures, the filter group fixedly positioned in front of the image pick-up device provided in a digital back or digital bock cover does not interfere with the focal plane shutter provided in the camera body when the camera is used as a digital camera.

In the illustrated embodiments, the quick return mirror provided in the camera body can be replaced by a stationary pellicle mirror.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An SLR camera system comprising:
   a camera body comprising a focal plane shutter;
   an interchangeable lens detachably attached to said camera body, said interchangeable lens comprising a lens shutter;
   a film back and a digital back which are selectively attached to said camera body, said film back accommodating a light-sensitive film which is to be positioned, upon the attachment thereof to said camera body, at a focal plane located in said camera body, said digital back comprising an image pick-up device, said image pick-up device having a sensitive surface which is positioned at said focal plane upon the attachment of said digital back to said camera body;

a drive mechanism, provided in said digital back, which drives said image pick-up device in a direction of an optical axis of said interchangeable lens; and a controller which controls said focal plane shutter, said lens shutter, and said drive mechanism when said digital back and said interchangeable lens are attached to said camera body;

wherein when said digital back and said interchangeable lens are attached to said camera body, upon receiving a shutter release signal, said controller controls said focal plane shutter to fully open and subsequently controls said drive mechanism to advance said image pick-up device so as to move said sensitive surface thereof to said focal plane before controlling said lens shutter to operate, and wherein said controller controls said drive mechanism to retreat said image pick-up device and subsequently controls said focal plane shutter to shut after controlling said lens shutter to operate.

2. The SLR camera system according to claim 1, wherein said drive mechanism comprises:

at least one feed screw for moving said image pick-up device in said direction of said optical axis; and a drive motor for rotating said at least one feed screw in forward and reverse directions.

3. The SLR camera system according to claim 1, wherein said drive mechanism comprises a position detector for detecting the position of said image pick-up device, and at least one stopper which prevents said image pick-up device from advancing further when said sensitive surface has moved to said focal plane, and wherein said controller cuts off power supply to said drive motor before said sensitive surface reaches said focal plane in accordance with the detection of said position detector, when said image pick-up device is driven to advance by said drive mechanism.

4. An SLR camera system comprising:

a camera body comprising a focal plane shutter;

an interchangeable lens detachably attached to said camera body, said interchangeable lens comprising a lens shutter;

a film back and a digital back which are selectively attached to said camera body, said film back accommodating a light-sensitive film which is to be positioned, upon the attachment thereof to said camera body, at a focal plane located in said camera body, said digital back comprising an image pick-up device, said image pick-up device having a sensitive surface which is positioned at said focal plane upon the attachment of said digital back to said camera body;

a drive mechanism, provided in said digital back, which drives said image pick-up device in a direction of an optical axis of said interchangeable lens; and a controller which controls said focal plane shutter, said lens shutter, and said drive mechanism when said digital back and said interchangeable lens are attached to said camera body;

wherein said controller controls said focal plane shutter to fully open and subsequently controls said drive mechanism to advance said image pick-up device so as to move said sensitive surface thereof to said focal plane immediately after said interchangeable lens and said digital back are attached to said camera body, and wherein said controller controls said drive mechanism to retreat said image pick-up device and subsequently controls said focal plane shutter to shut when said digital back is detached from said camera body.

5. The SLR camera system according to claim 4, wherein said drive mechanism comprises:

at least one feed screw for moving said image pick-up device in said direction of said optical axis; and a drive motor for rotating said at least one feed screw in forward and reverse directions.

6. The SLR camera system according to claim 4, wherein said drive mechanism comprises a position detector for detecting the position of said image pick-up device, and at least one stopper which prevents said image pick-up device from advancing further when said sensitive surface has moved to said focal plane, and wherein said controller cuts off power supply to said drive motor before said sensitive surface reaches said focal plane in accordance with the detection of said position detector, when said image pick-up device is driven to advance by said drive mechanism.

7. An SLR camera system comprising:

a camera body comprising a focal plane shutter;

an interchangeable lens detachably attached to said camera body, said interchangeable lens comprising a lens shutter;

a film back and a digital back which are selectively attached to said camera body, said film back accommodating a light-sensitive film which is to be positioned, upon the attachment thereof to said camera body, at a focal plane located in said camera body, said digital back comprising an image pick-up device, said image pick-up device having a sensitive surface which is positioned at said focal plane upon the attachment of said digital back to said camera body;

a drive mechanism, provided in said digital back, which drives said image pick-up device in a direction of an optical axis; and a controller which controls said focal plane shutter so as to fully open and subsequently controls said drive mechanism to advance said image pick-up device so as to move said sensitive surface thereof to said focal plane immediately after said interchangeable lens and said digital back are attached to said camera body.

8. An SLR camera system comprising:

a camera body comprising a focal plane shutter, a hinge, a film back cover which can be coupled to said hinge so as to be openable about said hinge, and a pressure device for pressing against a light-sensitive film in the area of a film frame to keep said light-sensitive film flat thereat;

a digital back cover which can be coupled to said hinge instead of said film back cover so as to be openable about said hinge, said digital back cover comprising an image pick-up device, wherein a sensitive surface of said image pick-up device is to be positioned at a focal plane located in said camera body;

a back-cover detector, wherein in the case where said digital back cover is coupled to said hinge, when said digital back cover is rotated about said hinge from an open state to a closed state, said back-cover detector detects a position wherein said focal plane shutter needs to be opened in order to prevent said sensitive surface of said image pick-up device from interfering with said focal plane shutter;

an interchangeable lens detachably attached to said camera body comprising a lens shutter; and a controller which controls said focal plane shutter when said digital back cover and said interchangeable lens are attached to said camera body;

wherein in the case where said digital back cover is coupled to said hinge, when said digital back cover is rotated about said hinge from said open state to said closed state, said controller controls said focal plane shutter to fully open so as to allow said sensitive surface of said image pick-up device to move to said focal plane immediately after said back-cover detector detects said position, and when said digital back cover is rotated about said hinge from said closed state to said open state, said controller controls said focal plane shutter to shut immediately after said back-cover detector detects said position.

9. The SLR camera system according to claim 1, wherein said interchangeable lens further comprises an iris diaphragm.

10. The SLR camera system according to claim 1, wherein said image pick-up device comprises a CCD image sensor.

11. The SLR camera system according to claim 1, wherein said digital back further comprises a filter group fixedly positioned in front of said image pick-up device.

12. The SLR camera system according to claim 8, wherein said back-cover detector comprises:

a projection which is formed integral with said digital back cover; and a switch, provided in said camera body, which is turned ON and OFF when said projection of said digital back cover presses against and withdraws from said switch, respectively.

* * * * *